United States Patent [19]
Tazawa et al.

[11] Patent Number: 6,034,719
[45] Date of Patent: Mar. 7, 2000

[54] IMAGE INPUT APPARATUS

[75] Inventors: Masashi Tazawa, Kawasaki; Toshiya Aikawa, Yokohama; Maki Suzuki, Ichikawa; Eisaku Maeda, Sakura, all of Japan

[73] Assignee: Nikon Corporation, Tokyo, Japan

[21] Appl. No.: 09/054,517

[22] Filed: Apr. 3, 1998

Related U.S. Application Data

[63] Continuation-in-part of application No. 08/844,661, Apr. 21, 1997, abandoned.

[30] Foreign Application Priority Data

Apr. 19, 1996 [JP] Japan ........................................ 8-98314
Apr. 19, 1996 [JP] Japan ........................................ 8-98662

[51] Int. Cl.$^7$ ............................ H04N 7/14; H04N 5/253; H04N 3/36
[52] U.S. Cl. ............................................... 348/96; 348/97
[58] Field of Search .................. 348/96, 97; H04N 7/18, H04N 5/253, 3/36

[56] References Cited

U.S. PATENT DOCUMENTS 5,541,644  7/1996  Nanba ........................................ 348/96
5,659,354  8/1997  Oosaka ...................................... 348/96

FOREIGN PATENT DOCUMENTS

A-5-75922  3/1993  Japan .

*Primary Examiner*—Howard Britton
*Attorney, Agent, or Firm*—Oliff & Berridge, PLC

[57] ABSTRACT

An image input apparatus enables image reading at a number of different resolutions including higher and lower resolutions without incurring excessive costs. In the present invention, the image input apparatus includes two scanning states. A first scanning state is achieved by performing film take-up with a take-up spool driven by a DC motor and high-speed image reading during the scan. A second scanning state is achieved by performing film feeding with a scan roller driven by a step motor and lower speed image reading during this scan.

16 Claims, 13 Drawing Sheets

IMAGE INPUT APPARATUS

RELATED APPLICATION

The entire disclosure of application Ser. No. 08/844,661 is hereby incorporated by reference herein in its entirety. This is a Continuation-In-Part of application Ser. No. 08/844,661, filed Apr. 21, 1997, now abandoned.

INCORPORATION BY REFERENCE

The disclosures of the following priority applications are herein incorporated by reference: Japanese Patent Applications Nos. 8-98314, filed Apr. 19, 1996, 8-98662, filed Apr. 19, 1996 and 9-82898, filed Apr. 1, 1997.

BACKGROUND OF THE INVENTION

1. Field of Invention

The present invention relates to an image input apparatus that reads the images of the transmitted copies of photographic film and converts them into digital data.

2. Description of Related Art

By converting film images photographed by a camera into electronic data, it becomes possible to perform more easily various types of image processing.

A film scanner is one image input apparatus for converting these film images into electronic data (Japanese Laid-Open Patent No. 5-75922).

FIG. 8 is a structural drawing showing the composition of this film scanner.

The film scanner 81 shown in FIG. 8 is constituted by a film feeding reel 83, a film loader 84, a take-up reel 85, an imaging optical system 86, a two-dimensional image sensor 87, an image signal processing circuit 88, and a video monitor 89.

Also, the imaging optical system 86 is constituted by an illuminating unit 86a and an imaging lens unit 86b.

The photographic film 82 is loaded in the film loader 84. The film feeding reel 83 feeds the photographic film 82. Also, this feed photographic film 82 is taken up by the take-up reel 85. The part from the film feeding reel 83 to the take-up reel 85 constitutes the film feeding system.

When a film cartridge 83 is loaded into the image input apparatus, an axial fork shaft 83a is driven to rotate by a fork shaft driver (not shown) automatically for a specified time, and at the same time the film 82 is delivered out from the film cartridge 83. The leader of the film delivered out is taken up tightly to take-up reel 85 (henceforth called thrust action).

When the thrust action is completed, the film 82 is wound up by causing the take-up reel 85 to rotate.

A difference is provided between the rotation speed of the fork shaft driver and the rotation speed of the take-up reel 85. That is, the take-up reel 85 rotates faster than the fork shaft driver. However, the fork shaft driver is provided with a one-way clutch. Therefore, if the rotation speed of the take-up reel 85 is faster than the fork shaft driver, the fork shaft driver slips. Consequently, there is no slacking or tearing off of the film.

For such an image input apparatus of the prior art, the thrust action was performed by delivering out the film for a specified time when the film is loaded for image reading.

In fact, commonly, the sliding resistance and friction load of the film in film cartridges are individually different for each film cartridge. Therefore, when the sliding resistance and friction load are high, there is a problem that the thrust action gets stopped automatically when the specified time has passed, regardless of the fact that the film has not all been delivered out from the film cartridge.

On the other hand, when the sliding resistance and friction load are low, the film is delivered out too much from the film feeding reel 83. Also, it is taken up on the take-up reel 85 as far as the image part of the film. As a result, there is a problem that the image on the leading frame of the film becomes unreadable.

Also, the two-dimensional image sensor 87 comprises a CCD image sensor. The image signal processing circuit 88 processes the image signals read by the two-dimensional image sensor 87. Video monitor 89 displays the images processed by the image signal processing circuit 88.

In the composition as described above, one frame of the photographic film 82 is placed in a specified position relative to the imaging optical system 86 by the actuation of the take-up reel 85. In this state, the transmitted image of the photographic film 82 illuminated by the illuminating unit 86a is read by the two-dimensional image sensor 87.

The two-dimensional image sensor 87 is for reading the images two-dimensionally. Imaging lens unit 86b performs image reading by projecting the transmitted images of the photographic film 82 onto the light-receiving area of the two-dimensional image sensor 87.

These transmitted images, are read by image sensor 87, are processed by the image signal processing circuit 88 and then displayed on the video monitor 89.

The image reading is performed at a high speed when performing such image reading, and when confirming the entire contents of a plurality of image data recorded on the photographic film. In such case, it is not necessary to read the images at high resolution, and high-speed image reading can be performed by dropping the reading resolution.

With conventional apparatus the highest resolution of the read images that can be obtained is determined based on the number of pixels of the two-dimensional image sensor. When trying to increase this resolution, it is necessary to use a two-dimensional image sensor having a higher number of pixels. Such two-dimensional image sensors of high pixel count are extremely expensive, and they end up increasing the cost of the film scanner.

SUMMARY OF THE INVENTION

The present invention was made to eliminate the problems with conventional image reading apparatus, and it makes possible image reading at a plurality of resolutions up to a higher resolution than previously possible without incurring excessive costs.

The image input apparatus of the present invention comprises an illuminating means that projects light onto transmitted copies, a first movement means that moves the transmitted copies, a second movement means that moves the transmitted copies at a speed different from that of the first movement means, and an image reading means that reads two-dimensionally the images of the transmitted copies by scanning along with the movement of the first or second movement means.

Consequently, an apparatus according to the present invention allows image reading to be performed at different scanning speeds, i.e. scanning speeds achieved by a first movement means and scanning speeds achieved by a second movement means.

The invention comprises a first drive means that drives the first movement means, and a second drive means that drives the second movement means at a speed different from that of the first drive means. An image reading means reads two-dimensionally the transmitted copies by scanning along with the movement of the respective movement means. Consequently, image reading as performed by the present invention occurs at different scanning speeds.

High speed scanning allows for low resolution image reading and low speed scanning allows for high resolution image reading.

BRIEF DESCRIPTION OF THE DRAWINGS

The invention will be described in conjunction with the following drawings in which like reference numerals designate like elements and wherein:

FIG. 2(a) is a side elevation view in partial cross section showing detailed structure of the image input apparatus 1 of FIG. 1a.

DETAILED DESCRIPTION OF PREFERRED EMBODIMENTS

Figure 1A:
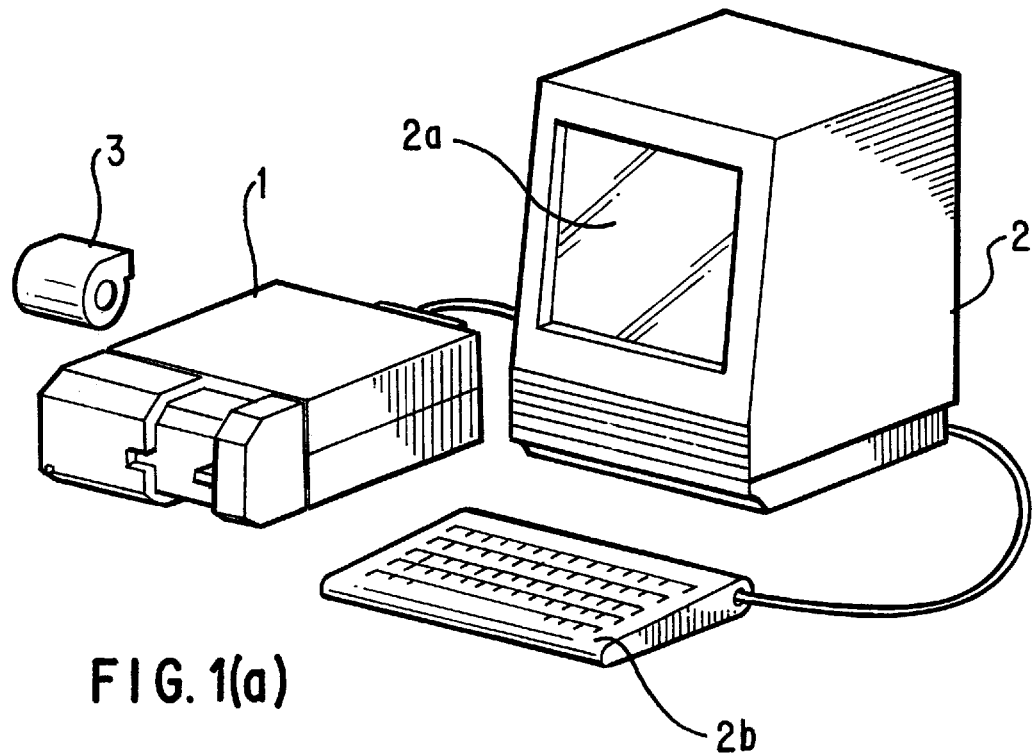
FIG. 1(a) is a perspective drawing showing the components of an image input system according to a first preferred embodiment of the present invention.

Preferred embodiments of the present invention are explained below, referring to the drawings.

Preferred Embodiment 1

FIG. 1 is a perspective drawing showing the composition of an image input system in the first preferred embodiment of the present invention.

As shown in FIG. 1(a), this image input system includes the image input apparatus 1 and a computer 2. The operations of this image input apparatus 1, such as two-dimensional reading, are controlled by the computer 2. Also, the image input apparatus 1 optically reads the images on the developed film as it is fed from the loaded film cartridge 3.

Computer 2 is connected to a keyboard. The user instructs the operations by operating the keyboard.

Figure 1B:
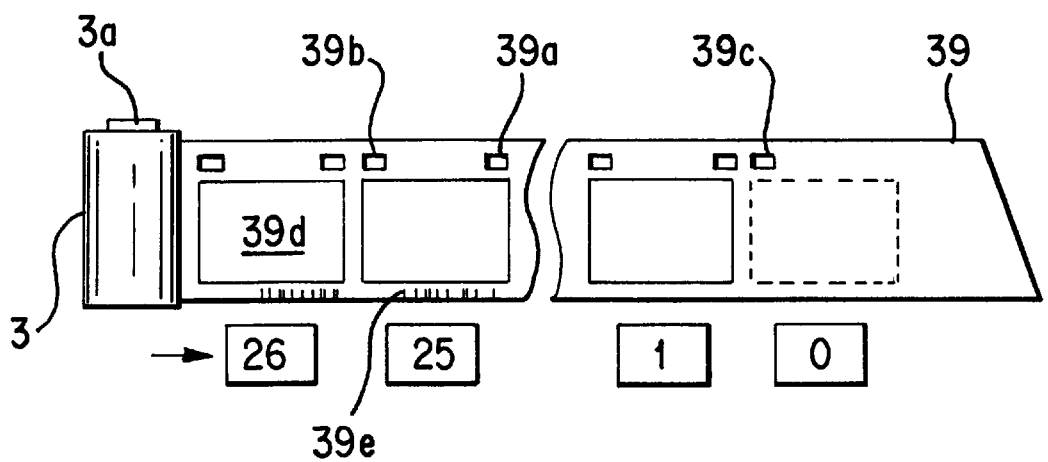
FIG. 1(b) is a top plan view of the film cartridge shown in FIG. 1(a), with a portion of the film being extended therefrom.

As shown in FIG. 1(b), film cartridge 3 houses film 39 with one end of film 39 being fixed to a spool 3a.

Film 39 is provided with two perforations 39a and 39b for marking each photographic frame. A null frame area, not photographed, is provided before the first photographic frame. A perforation 39c is provided on the null frame area. An end perforation provided after the last frame indicates that there are no photographic frames beyond the end perforation. Bar codes 39e can be provided along the edge of film 39 opposite perforations 39a and 39b. Images are stored on image storage areas 39d.

Figure 1C:
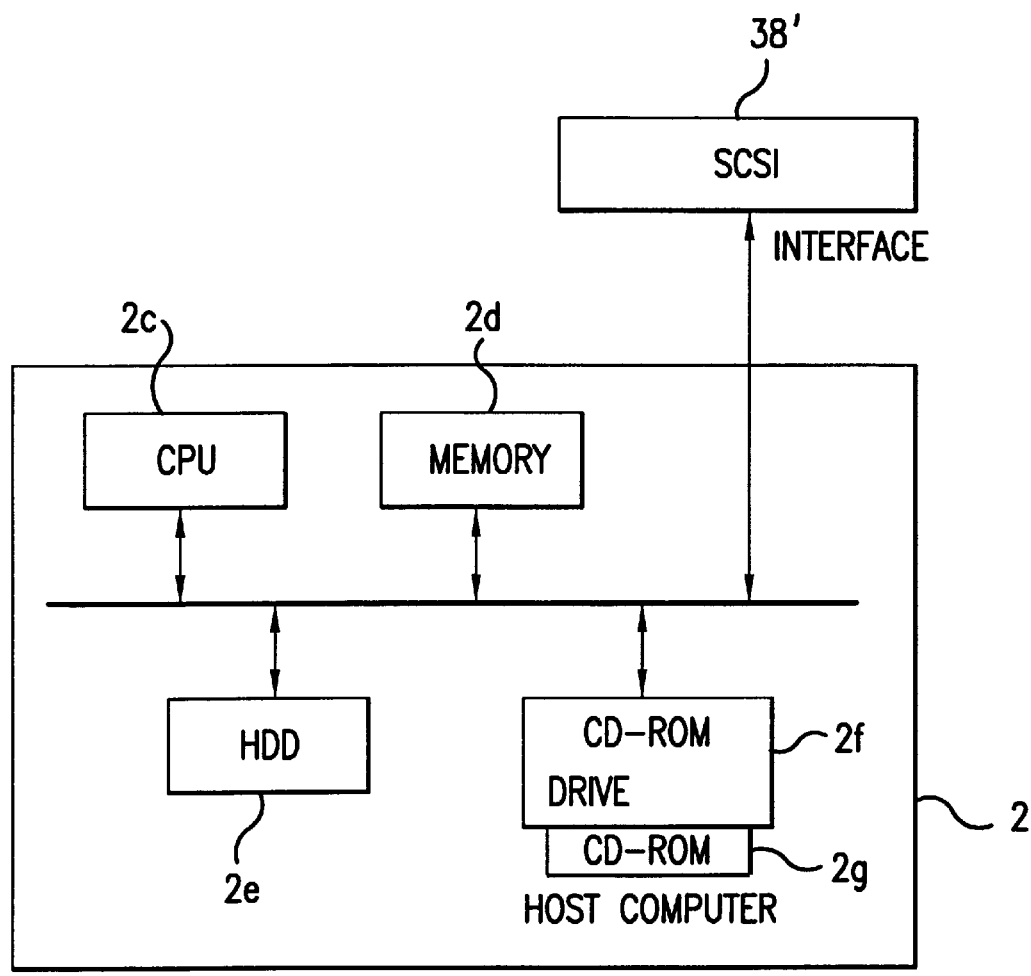
FIG. 1(c) is a block diagram showing a detailed composition of the computer in the system of FIG. 1(a).
Figure 2A:
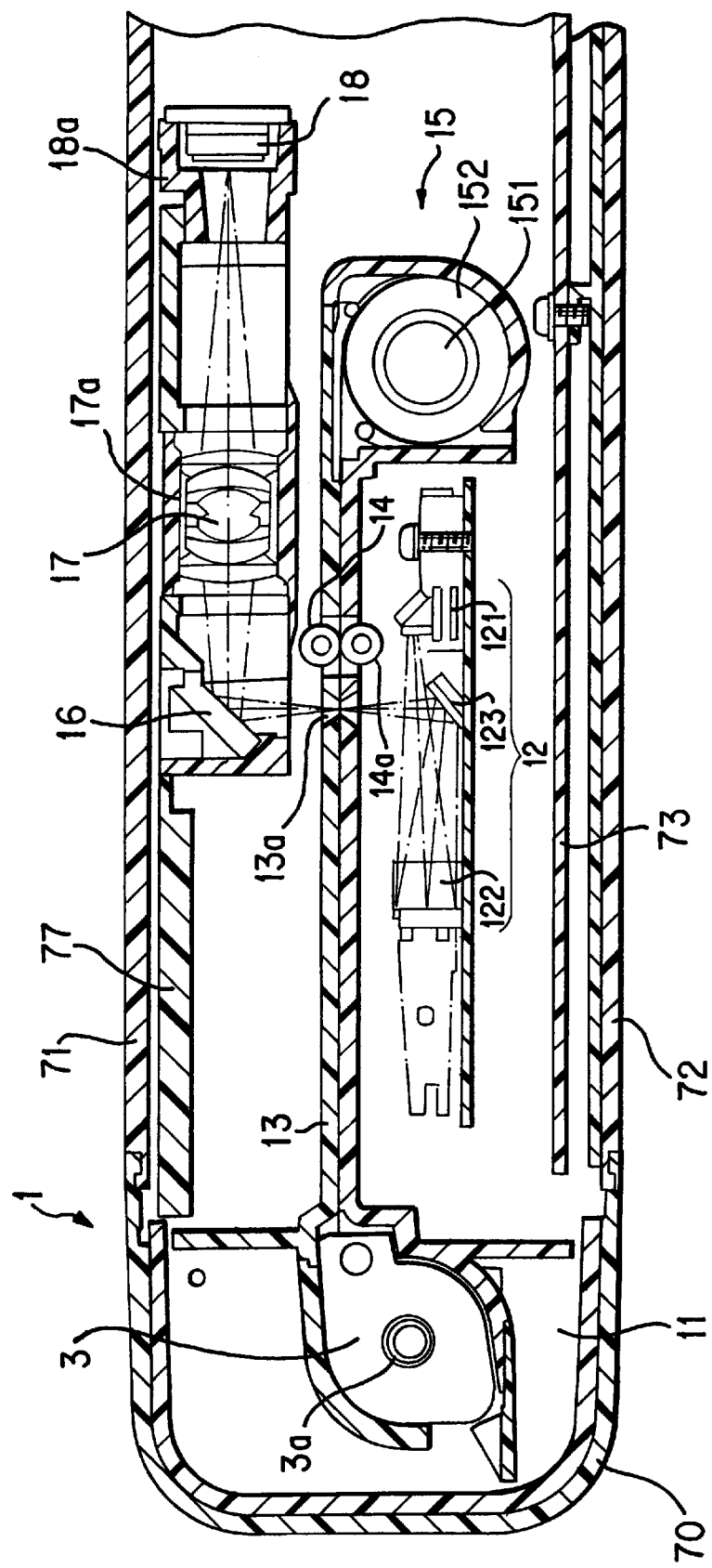
Figure 2B:
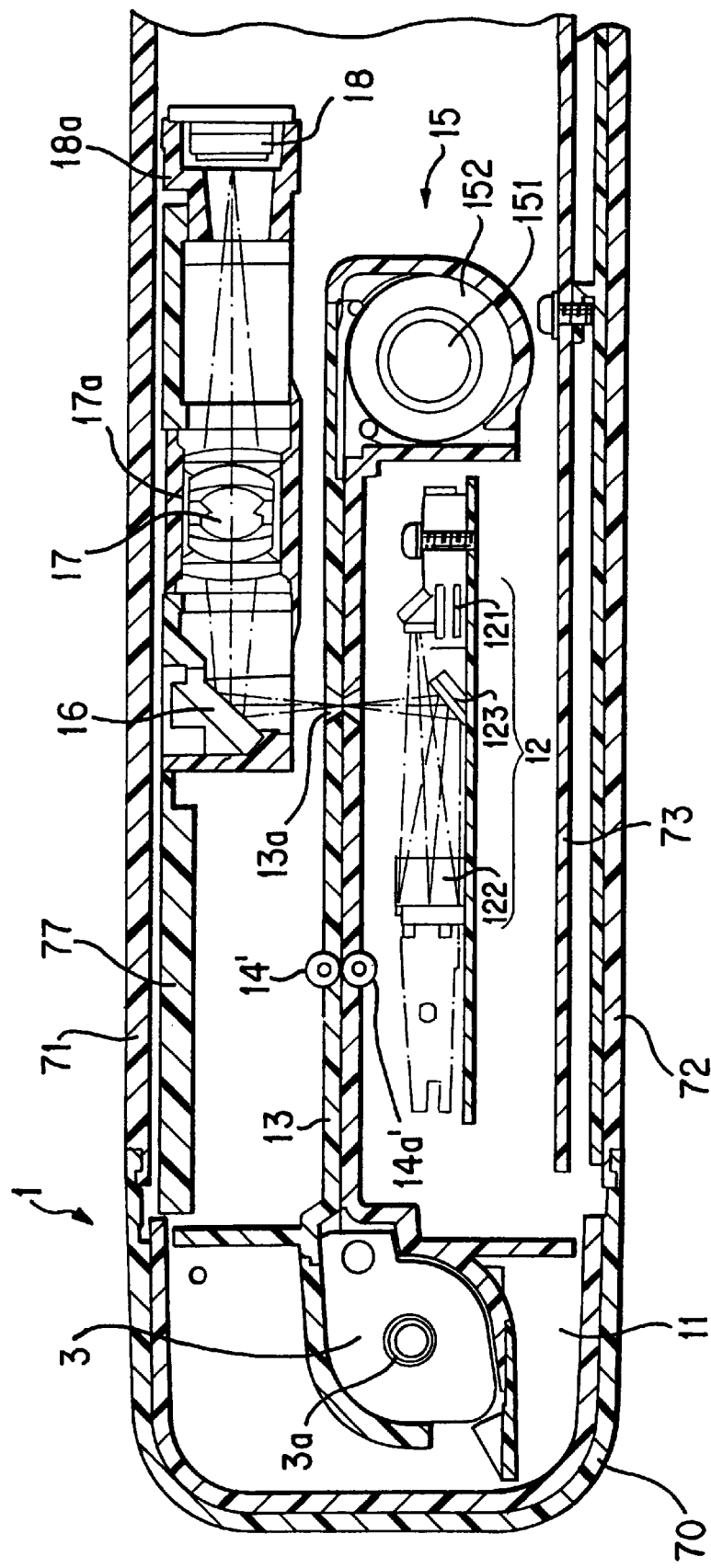
FIG. 2(b) is a side elevation view similar to FIG. 2(a), showing a scan roller and tension roller positioned between the film cartridge and the image window.
Figure 3:
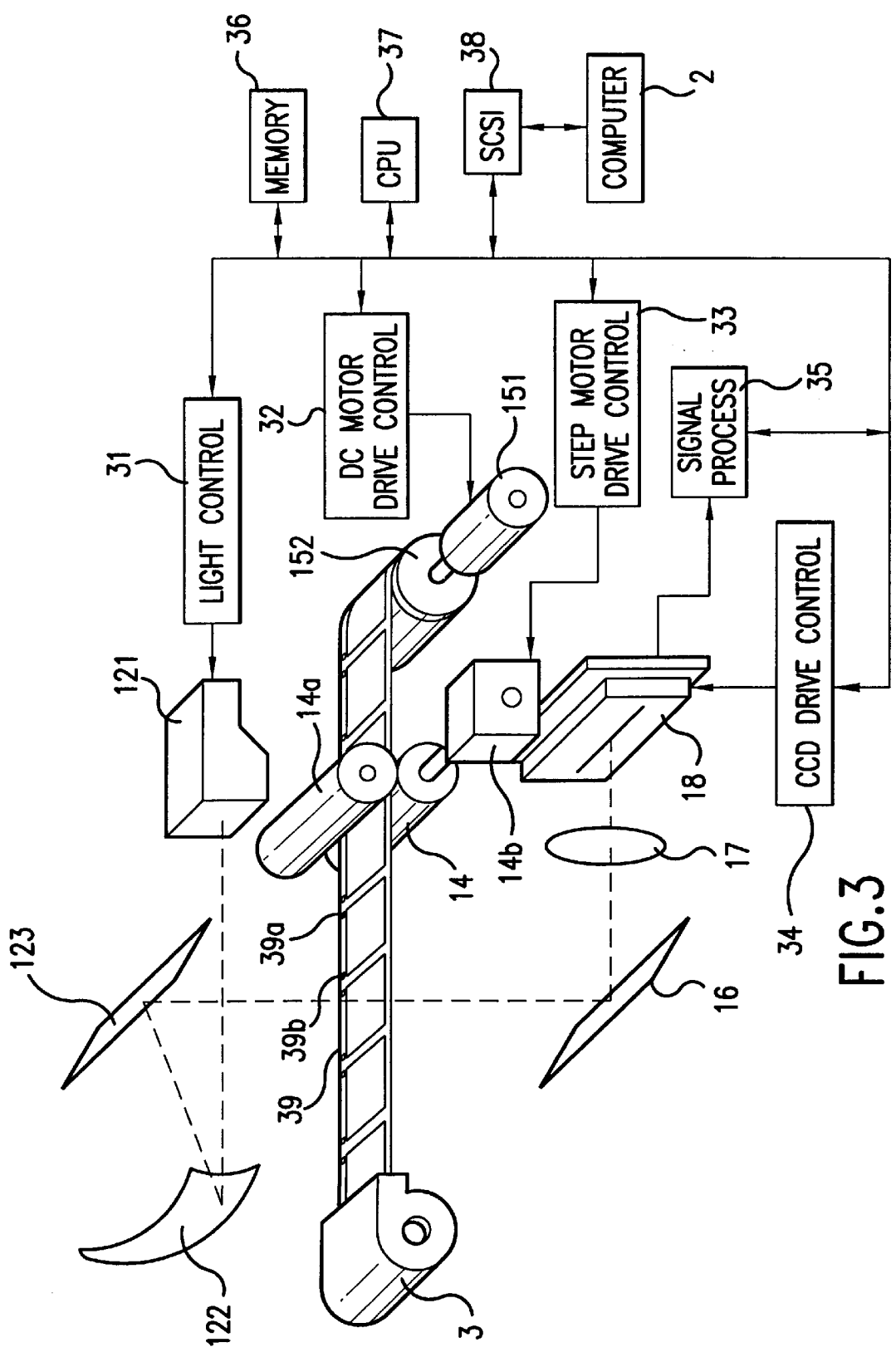
FIG. 3 is a perspective view showing a block schematic rendering of the image input apparatus 1.

FIGS. 2(a) and 2(b) are structural drawings showing a more detailed construction of the image input apparatus of FIG. 1. FIG. 3 is a block drawing showing the composition of the image input system.

As shown in FIGS. 2(a) and 2(b), cartridge loading chamber 11 is the place where the film cartridge 3 is loaded. Illuminating optical system 12 is for illuminating the film 39. Film feeding block 13 is the part that becomes the guide when feeding the film from the film cartridge 3.

The film delivered through film feeding block 13 passes between a scan roller 14, and a tension roller 14a, and is delivered into a take-up housing 15. Film 39 delivered into housing 15 is taken up by a take-up spool 152. Take-up spool 152 is driven to rotate by a DC motor 151 (second drive source) capable of high-speed rotation. DC motor 151 can also be drivingly connected to a central shaft 3a through film cartridge 3 in order to deliver film out of cartridge 3 or rewind film into the cartridge.

The scan roller 14 is driven to rotate by a step motor 14b (first drive source) shown in FIG. 3. Scan roller 14 and tension roller 14a sandwich the film. Also, the film can be fed by the rotation of scan roller 14.

Film passing through a window 13a of the film feeding block 13 is illuminated by the illuminating optical system 12. Light transmitted through film 39 passes through and is focused by a projection lens 17 after the direction of the transmitted light is changed by a 45-degree mirror 16. The transmitted light focused by projection lens 17 is received by a reader 18.

The illuminating optical system 12 includes an illuminating light source 121 composed of LEDs, a toric mirror 122, and a 40-degree mirror 123. The light emitted from the illuminating light source 121 reaches the film after being reflected by the toric mirror 122, and reflected by the 40-degree mirror 123. An image projection hood 17a, shown in FIGS. 2(a) and 2(b), performs light blocking and dust protection for the projection lens 17. Similarly, a CCD (charge coupled device) holder 18a, shown in FIGS. 2(a) and 2(b), performs light blocking and dust protection for CCD reader 18. The entire image input apparatus 1 is covered by cases 70, 71 and 72. Components of image input apparatus 1 are positioned on a main board 73 and a mega-body 77.

The images on the film passing through the window 13a and illuminated by the illumination from light source 121 are projected on the light-receiving surface of the reader 18 after being reflected by 45-degree mirror 16, and focused by projection lens 17. The reader 18 includes a one-dimensional image sensor. The reader 18 photoelectrically converts the introduced light into analog image data. Detection of the perforations 39a, 39b and 39c, and bar codes 39e on the film 39 shown in FIG. 1(b) is also performed by reader 18.

CCD drive controller 34 shown in FIG. 3 reads the images and controls the main scan. CCD drive control circuit 34 performs the main scan of the reader 18, and outputs the analog image data to a signal processing circuit 35.

The lengthwise direction of the one-dimensional image sensor perpendicular to the movement of the film is called the main scan direction. The relative motion between reader 18 and film 39 resulting from movement of the film is called the auxiliary scan. Also, the moving direction of the auxiliary scan is called the auxiliary scan direction.

Two-dimensional images are read by sequentially performing the main scan in the lengthwise direction of the reader 18, and the auxiliary scan, performed by moving the film relative to reader 18. Step motor 14b provides one means for moving film 39. The auxiliary scan also may be performed by the DC motor 151.

When performing image reading using the above-described apparatus, high-resolution reading is greatly facilitated.

The resolution obtainable during the auxiliary scan is determined by the speed of the auxiliary scan and the reading interval of the one-dimensional image sensor. The resolution obtainable during the main scan is determined by the number of pixels of the one-dimensional image sensor.

In contrast, when using a two-dimensional image sensor as in conventional apparatus, the readable resolution is limited by the total number of pixels, and it is extremely difficult to increase this number of pixels. For example, when performing conventional image reading at a 640×480 dot resolution, a two-dimensional image sensor is required to have a minimum of 640×480 pixels.

A one-dimensional image sensor, on the other hand, may be provided with one array of 640 pixels.

Therefore, when a one-dimensional image sensor is used in combination with the present invention, higher resolution image scanning becomes possible while minimizing additional costs.

As shown in FIG. 3, the illuminating light source 121 is driven by a light source control circuit 31. The DC motor 151 is drive controlled by a DC motor drive control circuit 32. The step motor 14b that drives the scan roller 14 to rotate is drive controlled by a step motor drive control circuit 33. The signal processing circuit 35 is the circuit that processes the input image data.

The above-described circuits are controlled by the CPU 37 according to the commands included in the programs stored in the memory 36. Image input apparatus 1 performs data exchanges with the computer 2 via a SCSI interface 38.

FIG. 1(c) is a block diagram which shows a detailed composition of host computer 2 according to an embodiment of the invention. In FIG. 1(c), host computer 2 comprises CPU 2c, memory 2d, hard disk drive 2e, and CD-ROM drive 2f, connected via a bus. A CD-ROM 2g able to be inserted and ejected is installed in the CD-ROM drive 2f.

As described above, this host computer 2 is used as a terminal by the user mainly during image readout.

In order to reduce the manufacturing cost of an image input apparatus, CPU 37 and memory 36 are sometimes not provided in the image input apparatus 1. In this case, host computer 2 performs drive control of the image input apparatus 1 in addition to its other duties. In other words, the CPU 2c of the host computer 2 directly controls the DC motor drive control circuit 32, step motor drive control circuit 33, LED drive control circuit 31, CCD drive control circuit 34 or the like via the bus and SCSI interface 38'. In this configuration, the CPU 2c reads the control program stored in advance on hard disk drive 2e, on CD-ROM 2g installed in CD-ROM drive 2f or other recording medium to the memory 2d, and the drive of the image input apparatus is controlled according to this control program.

Furthermore, the control procedures related to FIGS. 4, 5 and 9–11 are stored as respective control programs in memory 36 of the image input apparatus 1, memory 2d of host computer 2, CD-ROM 2g installed in CD-ROM drive 2f, hard disk drive 2e or other memory medium. The programs can be supplied stored in internal memory of the apparatus or provided separately for downloading. The programs also can be supplied via a communications network such as, e.g., the Internet (Worldwide Web).

Accordingly, control of the image input apparatus 1 is performed by CPU 37 according to the control program stored in memory 36; or alternatively, control of the image input apparatus is performed by reading out via CPU 2c of host computer 2 the control program stored in memory 2d or CD-ROM 2g stored in CD-ROM drive 2f, or in the hard disk drive 2e.

Although tension roller 14a and scan roller 14 are shown in FIG. 2(a) to be positioned between window 13a and take-up spool 152, a tension roller 14a' and a scan roller 14' could be alternatively moved to the left as in FIG. 2(b) and positioned between film cartridge 3 and window 13a. Such a construction allows reader 18 to detect the leading edge of film 39 after film 39 is already held between tension roller 14a' and scan roller 14'. Therefore, the feeding of film 39 could be switched from the second drive source (DC motor 151) to the first drive source (step motor 146) as soon as the film is detected.

Figure 6A:
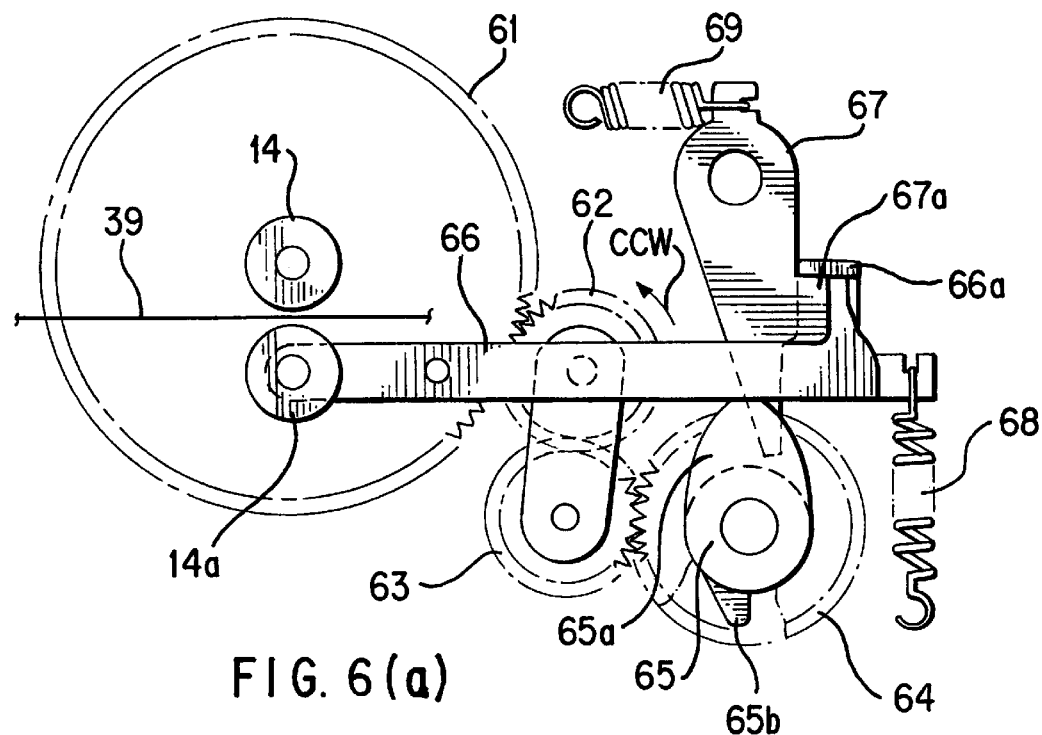
FIG. 6a is a side elevation view showing the detailed structure of the roller delivery mechanism constituted by scan roller and the tension roller when the mechanism is in a released state.
Figure 6B:
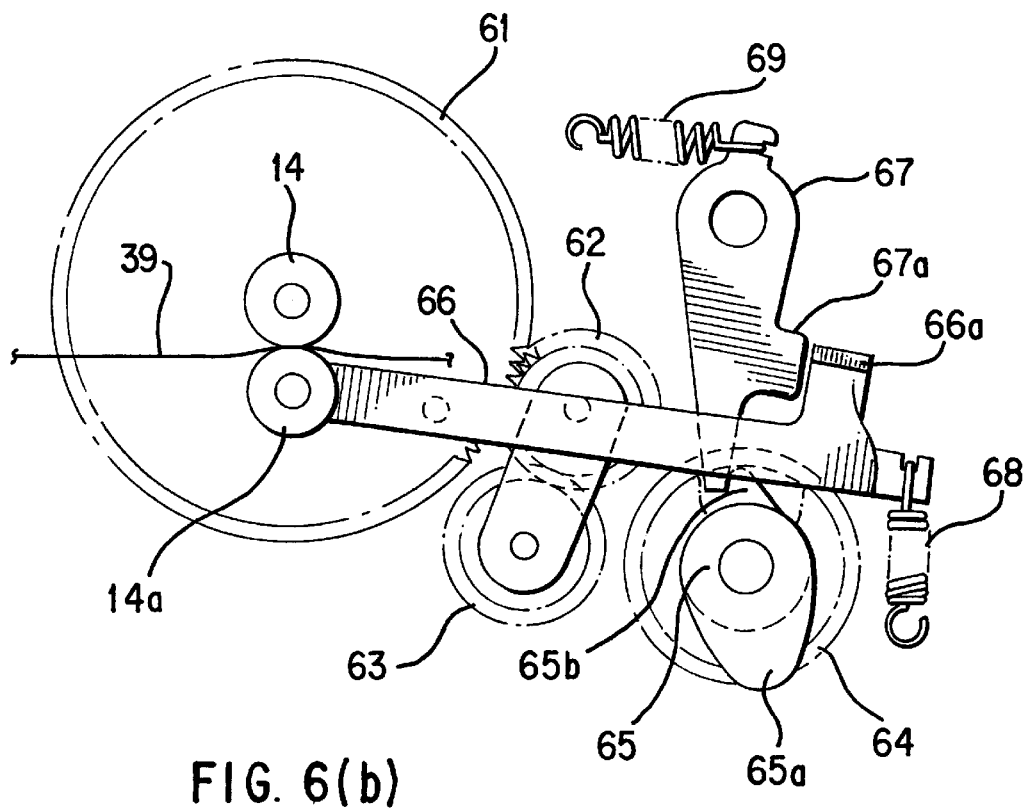
FIG. 6b is a side elevation view of the roller delivery mechanism of FIG. 6a, with the mechanism in a pressing state.

The operation of the roller delivery mechanism including scan roller 14 and tension roller 14a is described below:

FIGS. 6(a) and 6(b) show the interrelationship between the scan roller 14 and the tension roller 14a. FIG. 6(a) shows the state in which the pressing of the tension roller 14a against film 39 is released. FIG. 6(b) shows the state in which the tension roller 14a is pressed against film 39.

A ring gear 61 is fixed to the shaft of the scan roller 14. The ring gear 61 is meshed with and driven by a motor gear 62. The motor gear 62 is fixed to the motor shaft of the step motor 14b.

The rotation of step motor 14b is conveyed via the motor gear 62 to a planetary gear 63.

When the motor gear 62 rotates counterclockwise (henceforth called CCW), the planetary gear 63 planetates in the CCW direction about the shaft of the motor gear 62. As a result, planetary gear 63 contacts and meshes with a cam gear 64. The CCW rotation of the motor gear 62 is conveyed via the planetary gear 63 to drive cam gear 64 in the CCW direction.

Initially, the tension roller 14a is not pressed against the scan roller 14. Therefore, although the scan roller 14 rotates in a clockwise (henceforth CW) direction as a result of the rotation of the motor gear 62 in a CCW direction, scan roller 14 has no influence on the feeding of the film 39.

When the cam gear 64 starts to rotate in the CCW direction, a cam 65 integrally attached to cam gear 64 also starts to rotate. The lobe 65a of cam 65 moves from an initial position at which it pushes up a roller lever 66, to a position at which lobe 65a releases lever 66. When lobe 65a first releases the roller lever 66, a lock component 66a attached to roller lever 66 remains fixed by a lever lock 67.

As the cam gear 64 continues to rotate in a CCW direction, a locking arm 65b of cam 65 moves the distal end of the lever lock 67 toward the left in FIG. 6b.

The fixed state of the lock component 66a of the roller lever 66 is released as a boss 67a of the lever lock 67 is moved away from lock component 66a. Also, the distal end of the roller lever 66 is drawn down by a lever spring 68.

When the distal end of the roller lever 66 is drawn down, the tension roller 14a connected to the proximal end of lever 66 is pushed up against film 39 and scan roller 14.

A sensor (not shown) detects that lock component 66a has been released, and the step motor 14b starts to rotate in a CW direction.

As a result, the motor gear 62 also starts to rotate clockwise. Planetary gear 63 planetates about motor gear 62 in a CW direction. As a result, planetary gear 62 is no longer meshed with cam gear 64.

As shown in FIG. 6(b), the roller delivery mechanism can assume the following states: First, the mechanism assumes the state in which the tension roller 14a has pressed the film 39 against the scan roller 14. Film 39 is fed by the rotation of the scan roller 14. In this state, the feeding of the film 39 is performed by the rotation of the step motor 14b (FIG. 3) in a CW direction. The DC motor 151 is stopped.

Figure 5:
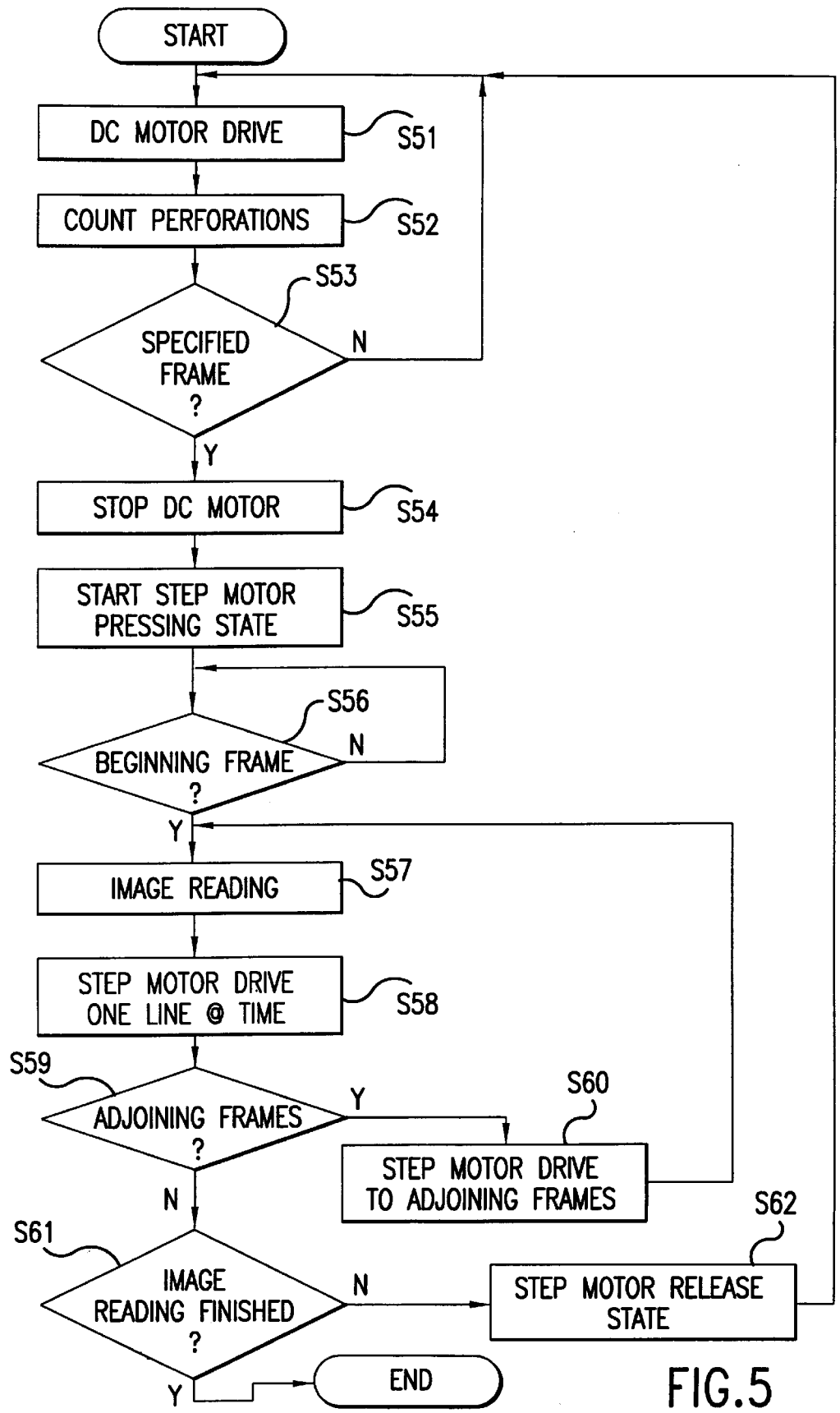
FIG. 5 is a flow chart showing the control procedures of the CPU during a higher resolution image reading.

The above described pressing operations of the tension roller occur during step S55 shown in the flow chart of FIG. 5. The release of the pressing of the tension roller occurs during step S62. The pressed state of the tension roller 14a is the state shown in FIG. 6(b). When moving to a release state, as shown in FIG. 6(a), the step motor 14b rotates in the CCW direction and drives motor gear 62 in a CCW direction.

Planetary gear 63 planetates in the CCW direction around the motor gear 62. As a result, the planetary gear 63 comes into contact with the cam gear 64 and the gears become meshed.

During this state, the rotation of the motor gear 62 is propagated via the planetary gear 63 to the cam gear 64.

When the cam gear 64 starts to rotate in the CCW direction, the cam 65 also starts to rotate. In succession, the locking arm 65b moves the distal end of the lever lock 67 toward the left in FIG. 6(b).

After the distal end of lever lock 67 is released by the locking arm 65b of cam 65, the lever lock 67 is returned by the lock spring 69. The boss 67a of lever lock 67 is now positioned against the side of the lock component 66a of the roller lever 66.

From this state, when the cam gear 64 rotates further, the cam lobe 65a pushes up the distal end of roller lever 66. At this time, the boss 67a enters into the lock component 66a of lever 66 and fixes the lever 66.

With the lock component 66a at the distal end of lever 66 having been locked, as shown in FIG. 6(a), the tension roller 14a connected to the proximal end of the roller lever 66 is removed from the scan roller 14. As a result, the feeding state of the film 39 by the step motor 14b (FIG. 3) is released.

Accordingly, two types of scan states are provided:

One scan state performs take-up of the film with the take-up spool 152 driven rotationally by the DC motor 151. Image reading is performed by the auxiliary scan at high speeds during this scan.

A second scan state performs feeding of the film 39 with the scan roller 14 driven rotationally by the step motor 14b. Image reading is performed by the auxiliary scan at lower speeds during this scan.

Figure 4:
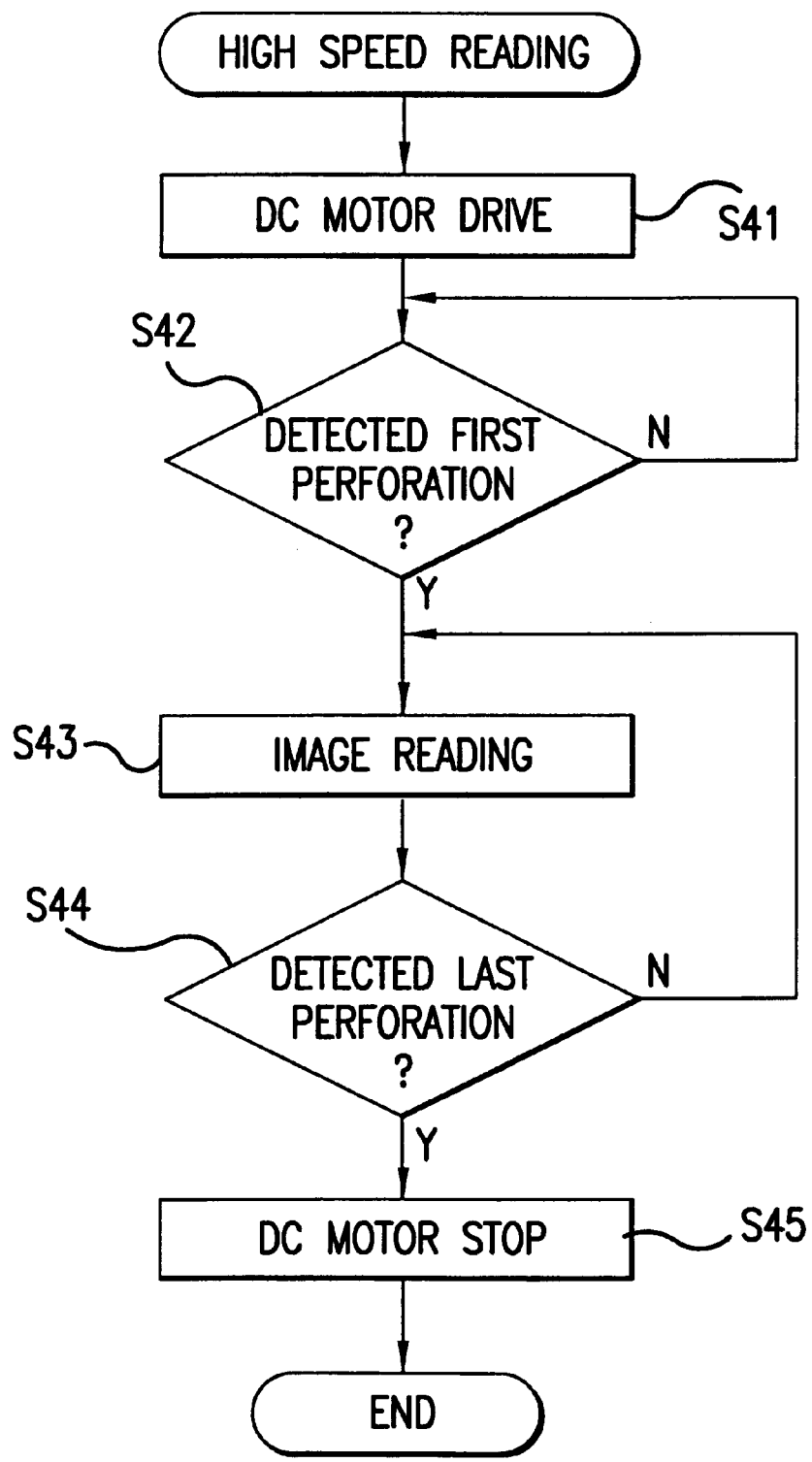
FIG. 4 is a flow chart showing the control procedures of the CPU during indexed image reading.

The operations of this image input apparatus 1 are explained below referring to the flow chart of FIG. 4. The flow chart of FIG. 4 shows the control means of the CPU 37 during indexed image reading.

First are explained the operations during crude, high-speed reading of the images, such as confirmation of all the image information recorded on the film 39 of the film cartridge 3.

First, when the film cartridge 3 is loaded into the cartridge loading chamber 11, the CPU 37 in step S41 starts the driving of the DC motor 151. The film 39 is delivered out of the film cartridge 3 by DC motor 151.

When the leader of film 39 reaches the take-up spool 152, the film 39 is taken up by the take-up spool 152. During this initial feeding, the tension roller 14a is not pressing the film 39 against the scan roller 14.

Next, in step S42, the reader 18 determines whether it has detected the first perforation 39c.

If the perforation is detected in step S42, it advances to step S43. In step S43, the CPU 37 controls the light source control circuit 31, and drives the illuminating light source 121. Also, the CPU 37 controls the CCD drive control circuit 34 so as to drive the reader 18 in synchronization with the illumination of the illuminating light source 121. When one line of image reading by the reader 18 in the main scan direction is finished, the CPU 37 controls the DC motor drive control circuit 32, and the DC motor drive control circuit 32 drives the DC motor 151 to move the film 39 a specified amount in the auxiliary scan direction.

In the image reading of step S43, the film 39 is moved at high speed, and the reading pitch is made crude in the auxiliary scan direction. Therefore, the resolution of the read images becomes crude.

Next, the CPU 37 in step S44 determines whether it has reached the last perforation based on the signals from the reader 18. If it is determined that the film is at the last perforation, in step S45, the CPU 37 controls the DC motor drive control circuit to stop the DC motor 151, and the process ends. Also, in step S44, if it is determined that the film is not at the last perforation, the process returns to step S43 and continues image reading.

When displaying images on the display screen of the computer 2 according to the above procedures, confirmation can be performed at high speed as to what image is recorded in which frame on the film 39.

If it is desired to perform image reading in a state having refined the reading pitch in the auxiliary scan direction by performing the take up of the film 39 at low speed, high-precision image reading becomes possible.

Next, the control means of the CPU 37 during higher precision image reading is explained using the flow chart of FIG. 5.

The user inputs operating instructions from the keyboard in the state with an index being displayed on the monitor of the computer 2. The user can select one or a plurality of indexed images displayed on the monitor. The user then starts the process outlined in the flow chart of FIG. 5 by instructing a scan when inputting operating instructions into the computer 2.

As described before, when the film cartridge 3 is loaded into the cartridge loading chamber 11, in step S51 the CPU 37 starts driving the DC motor 151.

The leader of film 39 reaches the take-up spool 152, and the film is taken up onto the take-up spool 152. At this time, the tension roller 14a is not pressing the film 39 against the scan roller 14.

Next, in step S52 the CPU 37 counts the number of perforations 39a detected by the reader 18. The CPU 37 performs this operation by processing the signals received from the signal processing circuit 35.

Next, in step S53 the CPU 37 determines whether or not the counted number of perforations has reached the number that indicates the frame position is one frame before a previously specified frame.

If step S53 determines that the number of perforations has become the number indicating a frame position one frame before the previously specified frame, it advances to step S54. If step S53 determines that the number of perforations has not become the number indicating the frame position one frame before the previously specified frame, it returns to step S51.

In step S54, the CPU 37 stops the DC motor 151 by driving the DC motor drive control circuit 32. In step S55, CPU 37 controls the step motor drive control circuit 33, and changes the tension roller 14a to a pressed state by rotating step motor 14b, and hence cam gear 64, in a CCW direction. As soon as a sensor determines that lock component 66a has been released, step motor 14b is rotated in a CW direction. By doing this, the film 39 enters the state of being fed by the step motor 14b.

Therefore, at step S55 the film 39 is fed by a roller delivery mechanism including the scan roller 14, the tension roller 14a, and the step motor 14b, and the scan control is performed by the rotational action of the step motor 14b.

Next, in step S56 the CPU 37 determines whether it has detected the perforation at the end of a specified frame. In step S56, if the CPU 37 detects that perforation, it advances to step S57 and it begins image reading.

In step S57, the CPU 37 drives the illuminating light source 121 by driving the light source control circuit 31.

Next, in step S58 the CPU 37 controls the CCD drive control circuit 34 so as to drive the reader 18 in synchronization with the illumination of the illuminating light source 121. Also, the CPU 37 controls the step motor drive control circuit 33. The step motor drive control circuit 33 drives the step motor 14b in a CW direction for the specified pulses corresponding to just the amount of movement for one frame.

During step S58 the CPU 37 repeats the control of the step motor drive control circuit 33 when the image reading of one line by the reader 18 is finished. The step motor drive control circuit 33 moves the film 39 a specified amount by driving the step motor 14b in a CW direction.

In step S59 the CPU 37 determines whether adjoining frames are specified by the user's operating instructions. If the CPU 37 determines that adjoining frames are specified, it advances to step S60. In step S60 the CPU 37 controls the step motor drive control circuit 33. Also, the step motor drive control circuit 33 drives the step motor 14b for the specified pulses corresponding to just the amount to move up to the position of the adjoining frames.

When adjoining frames are specified, the feeding of the film 39 is performed continuously by the driving of the step motor 14b in a CW direction, without releasing the pressing of the tension roller 14a.

If in step S59 it is determined that adjoining frames are not specified, the control means advances to step S61.

In step S61 the CPU 37 determines whether the image reading of all the frames specified by the user's operating instructions has finished. If the CPU 37 determines that the image reading of all the frames has finished, it ends the processing.

In step S61, if the CPU 37 determines that the image reading of all the frames has not finished, it advances to step S62. In step S62, it drives the step motor drive control circuit 33 and releases the pressed condition of the tension roller 14a by once again driving step motor 14b in a CCW direction, and causing cam gear 64 to rotate in a CCW direction, pushing roller lever 66 up with cam lobe 65a.

Also, it returns to step S51, and light source control circuit 31 shuts off illuminating light source 121.

During this image reading, when one line of reading is performed by the reader 18 while the step motor 14b is operating for one step, the images are read with a high resolution.

An even higher resolution may be obtained by such methods as advancing film 39 in microsteps.

Additional details of the operation of the present invention are explained as follows with reference to FIGS. 9–11. First, the user loads the film cartridge 18 into the cartridge chamber of the image input apparatus 1. Then, the thrust action is performed automatically by an initial wind up. Also, when the thrust action is completed, the user issues via the host computer 2 instructions regarding the reading of the film information. At this time, commonly all the images of the film are read out at high speed. All the read out images (henceforth called thumbnail images) are displayed on one screen of the CRT 2a shown in FIG. 1(a).

The user may be unclear from these thumbnail images, but images of all the images can be known. Also, the user inputs into the image input apparatus the desired images from among the thumbnail images displayed by selecting only their frame numbers. The selected images can then be read out again at high precision. The read out images are displayed on the CRT 2a.

After the read out is finished, the user inputs an eject command via the host computer 2. As a result, the film 39 is rewound by the DC motor 151. When the rewinding of the film 39 is completed, the user becomes able to remove the film cartridge 3 from the cartridge chamber.

The thrust action is explained in detail with reference to FIG. 9.

Figure 9:
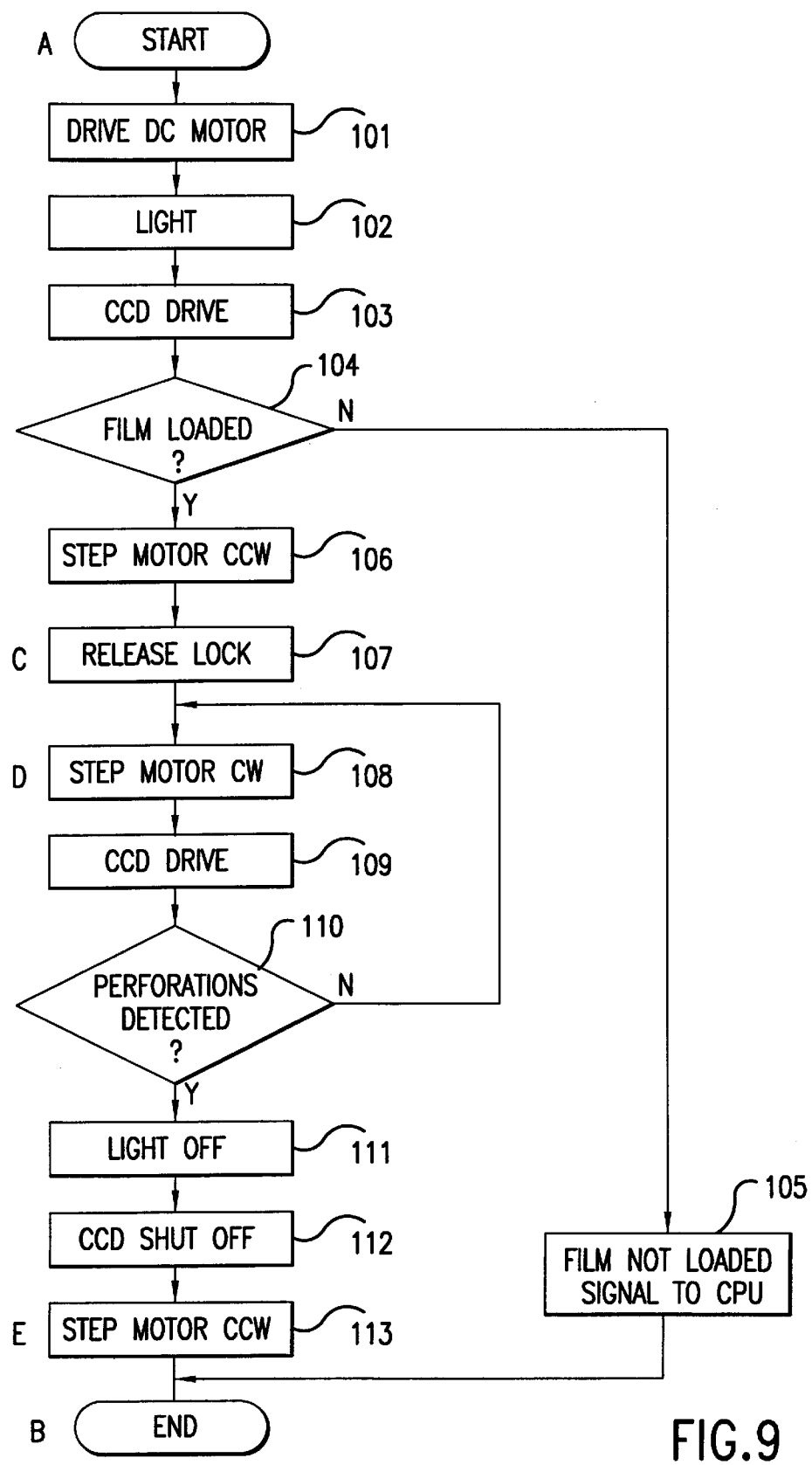
FIG. 9 is a flow chart showing the sequence of operations of the CPU during the thrust action.

FIG. 9 is a flow chart showing the sequence of actions of the CPU 37 in the thrust action. "A" represents the start of the operation and "B" the end. In step 101, when the film cartridge 3 is loaded into the image input apparatus 1, the CPU 37 via the DC motor drive control circuit 32 drives the DC motor 151 to rotate only for the specified time. When the DC motor 151 starts driving, the film 39 is delivered out from the film cartridge 3 at high speed. This film 39 is fed from the cartridge chamber into the film feeding block 13.

After that, when only the specified time passes, the CPU 37 via the DC motor drive control circuit 32 stops the driving of the DC motor 151. Consequently, feeding of the film is stopped.

In step 102, the CPU 37 via the LED drive control circuit 31 lights the LEDs within the LED block 121. The illumination from this lighting is projected onto the film 39.

In step 103, the CPU 37 via the CCD drive control circuit 34 drives the CCD 18. The CCD 18 reads the images of the film 39 from the illumination transmitted through the film 39. If film 39 is detected, the signal processing circuit 35 outputs a film sensing signal. That is, the CCD 18 is used as the sensing means for detecting the film.

In step 104, if the film sensing signal is not detected, the CPU 37 determines that the film cartridge 3 is not yet loaded. Also, in step 105 the CPU 37 passes the cartridge-not-loaded information to the host computer 2, or, if the CPU is not provided in the image input apparatus, the film sensing signal is sent to the CPU in the host computer. As a result, the thrust action ends.

Also, when in step 104 the CPU 37 detects the film sensing signal, in steps 106 and 107 the CPU 37 via the step motor drive control circuit 33 drives the step motor 14b to rotate only the specified number of pulses in the CCW direction. As a result, the roller lock mechanism releases the locked status as shown at C in FIG. 9.

In step 108, when the lock becomes released, the CPU 37 via the step motor drive control circuit 33 drives the step motor 14b to rotate in the CW direction. That is, the step motor 14b feeds the film 39 to the take-up spool 152 at low speed as shown at D in FIG. 9.

In step 109, the CPU 37 via the CCD drive control circuit 34 drives the CCD 18. Also, the CCD 18 reads the images of the film 39 being fed. Also, when the signal processing circuit 35 detects the perforations, it outputs a perforation detection signal. The output perforation detection signal is transmitted to the CPU 37. If the perforations are not detected in step 110, the CPU 37 returns the operating sequence to step 108.

After that, when in step 110 the CPU 37 senses the perforations, in step 111 the CPU 37 via the LED drive control circuit 31 extinguishes the LEDs. Also, in steps 112 and 113, the CPU 37 shuts off CCD 18 via CCD drive control circuit 34, and via the step motor drive control circuit 33 drives the step motor 14b to rotate only the specified number of pulses in the CCW direction. As a result, the roller lock mechanism becomes locked at E in FIG. 9, and the thrust action is completed.

A dedicated sensor may be provided in place of the CCD 18 for sensing the perforations. Also, the CCD 18 may perform detection of bar codes 39e instead of the perforations 39a, 39b and 39c.

Next, the operations of image reading of a specified frame are explained in detail with reference to FIG. 10.

Figure 10:
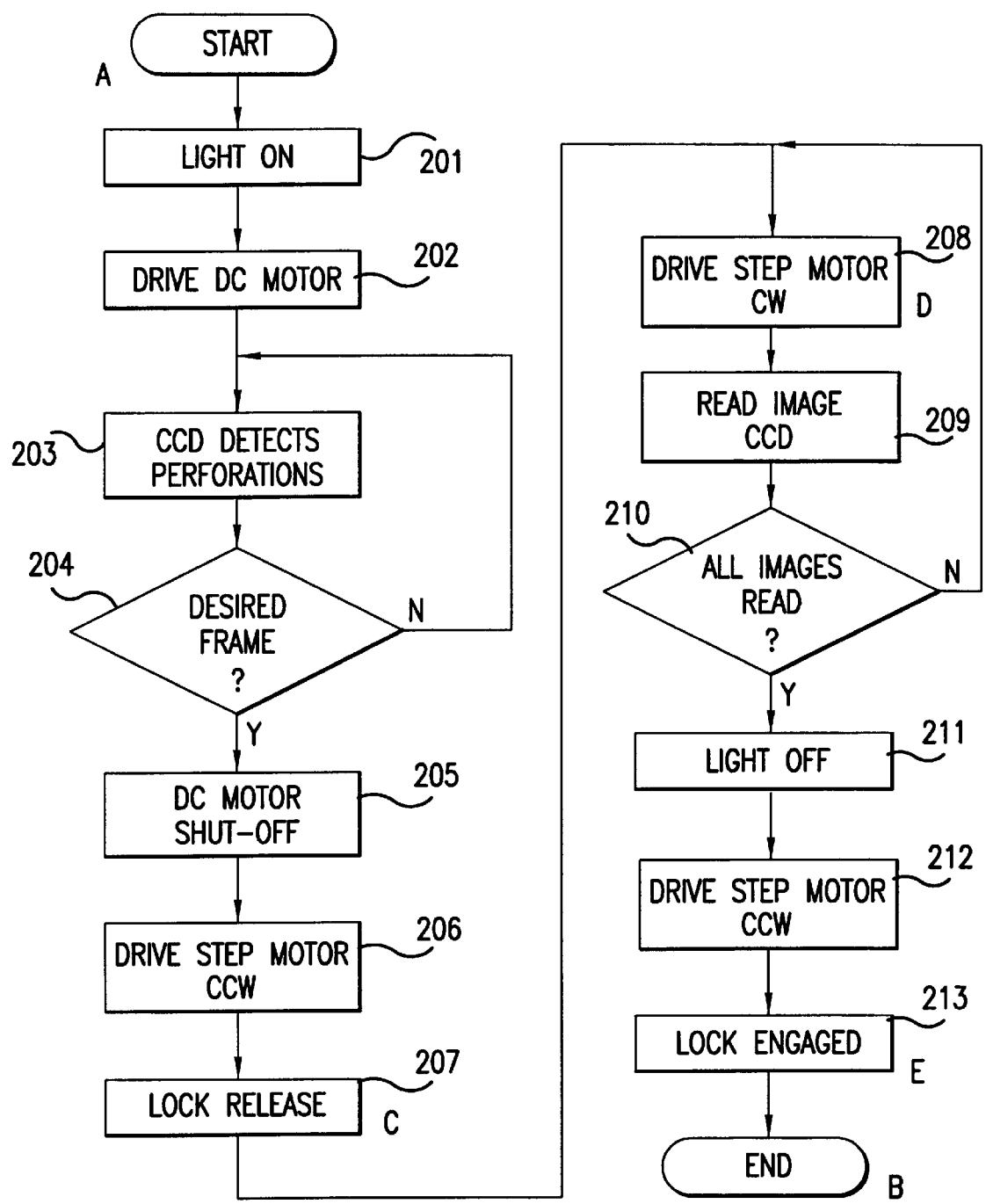
FIG. 10 is a flow chart showing the sequence of operations of the CPU during image reading.

FIG. 10 is a flow chart showing the sequence of operations of the CPU 37 when image reading of a specified frame is performed. "A" represents the start of the operation and "B" the end.

First, the user inputs the desired frame number into the image input apparatus via the host computer 2.

In step 201, the CPU 37 having received said frame number lights the LEDs via the LED drive control circuit 31. Also, in step 202 the CPU 37 via the DC motor drive control circuit 32 starts driving the DC motor 151 to rotate. As a result, the film 39 is fed to the take-up spool 152.

In step 203, the CPU 37 via the CCD drive control circuit 34 drives the CCD 18 to have the images read, and at the same time, performs detection of the perforations. Also, when the signal processing circuit 35 detects the perforations, it outputs a perforation sensing signal. The detected perforation sensing signal is transmitted to the CPU 37. The CPU 37 counts the number of perforations read from the perforation sensing signal received.

In step 204, when the number of perforations counted reaches the frame number previously input by the user, the CPU 37 via the DC motor drive control circuit 32 stops driving the DC motor 151 to rotate.

After that, in steps 206 and 207, the CPU 37 via the step motor drive control circuit 33 causes the step motor 14b to rotate only for the specified number of pulses in the CCW direction. As a result, the lock is released as shown at C in FIG. 10.

When the lock is released, in step 208 the CPU 37 via the step motor drive control circuit 33 causes the step motor 14b to rotate for one pulse in the CW direction. Also, in step 209 the CPU 37 via the CCD drive control circuit 34 has one line of the image read from the film 39 by the CCD 18.

In step 210, when the CPU 37 determines that the number of images read has not reached the specified number of lines, it returns the sequence of operations to step 208.

After that, when in step 211 the CPU 37 determines that the number of images read has reached the specified number of lines, it ends the reading operations. That is, at this time the scanning of one screen has been completed. Also, in step 211 the CPU 37 via the LED drive control circuit 31 extinguishes the LEDs.

In steps 212 and 213, the CPU 37 via the step motor drive control circuit 33 causes the step motor 14b to rotate for the specified number of pulses in the CCW direction. As a result, the lock mechanism becomes locked.

Next, the operations of thumbnail image generation are explained in detail with reference to FIG. 11.

Figure 11:
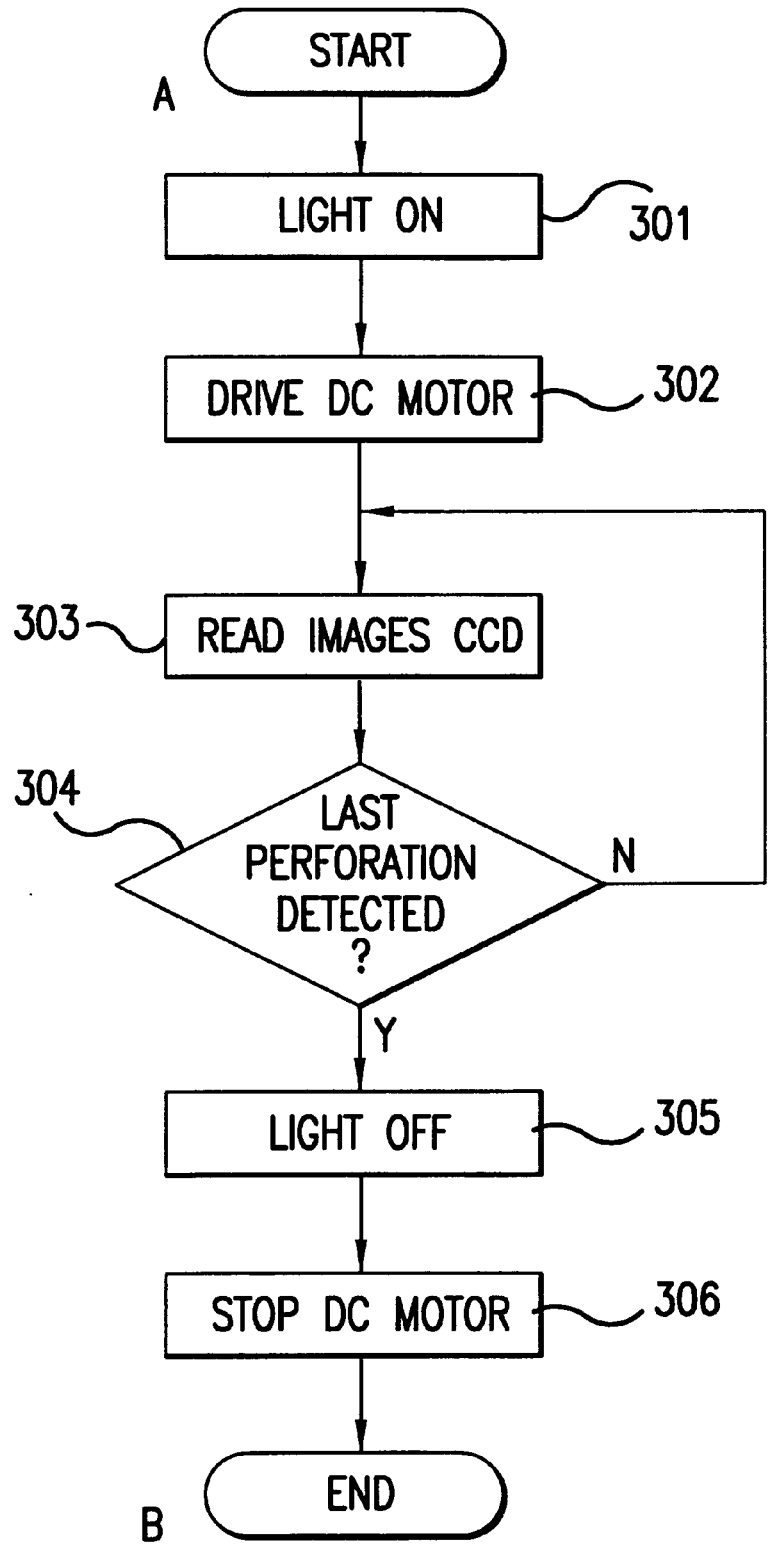
FIG. 11 is a flow chart showing the sequence of operations of the CPU during thumbnail image generation.

FIG. 11 is a flow chart showing the sequence of operations of the CPU 37 when generating thumbnail images. "A" represents the start of the operation and "B" the end.

First, the user inputs the command for thumbnail image generation into the image input apparatus 1 via the host computer 2.

In step 301, when the CPU 37 receives the command for thumbnail image generation, the CPU 37 via the LED drive control circuit 31 lights the LEDs according to this command for thumbnail image generation.

In step 302, the CPU 37 via the DC motor drive control circuit 32 drives the DC motor 151. Also, the DC motor 151 causes the take-up spool 152 to rotate. The film 39 is taken up on the take-up spool 152.

In step 303, the CPU 37 via the CCD drive control circuit 34 has the images of the film 39 read by the CCD 18.

In step 304, when the perforations are detected by the CCD 18, the signal processing circuit 35 outputs a perforation detection signal. The perforation detection signal is transmitted to the CPU 37. When the CPU 37 determines from the received perforation detection signal that the perforations detected are not of the last frame, it returns the sequence of operations to step 303.

After that, when in step 304 the CPU 37 detects the perforations of the last frame, in step 305 the CPU 37 via the LED drive control circuit 31 turns off the LEDs. Also, in step 306 the CPU 37 via the DC motor drive control circuit 32 stops the DC motor 151.

The images of each frame read in the above manner are transmitted via the SCSI interface 38, as shown in FIG. 3, to the host computer 2. Also, these images of each frame are displayed as thumbnail images on the CRT 2a shown in FIG. 1(*a*).

Figure 7:
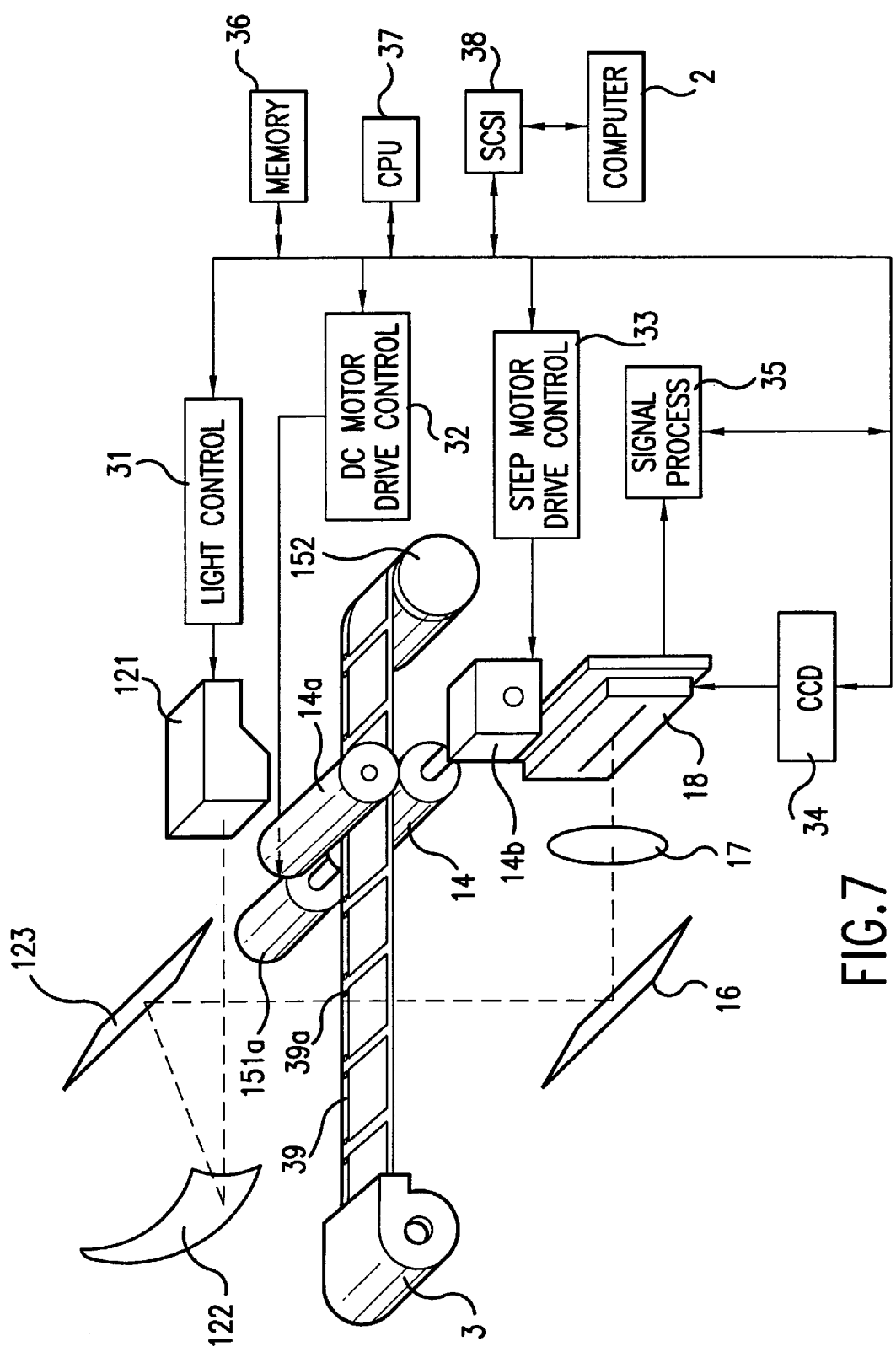
FIG. 7 is a perspective view of an image input system according to a second preferred embodiment of the present invention.
Figure 8:
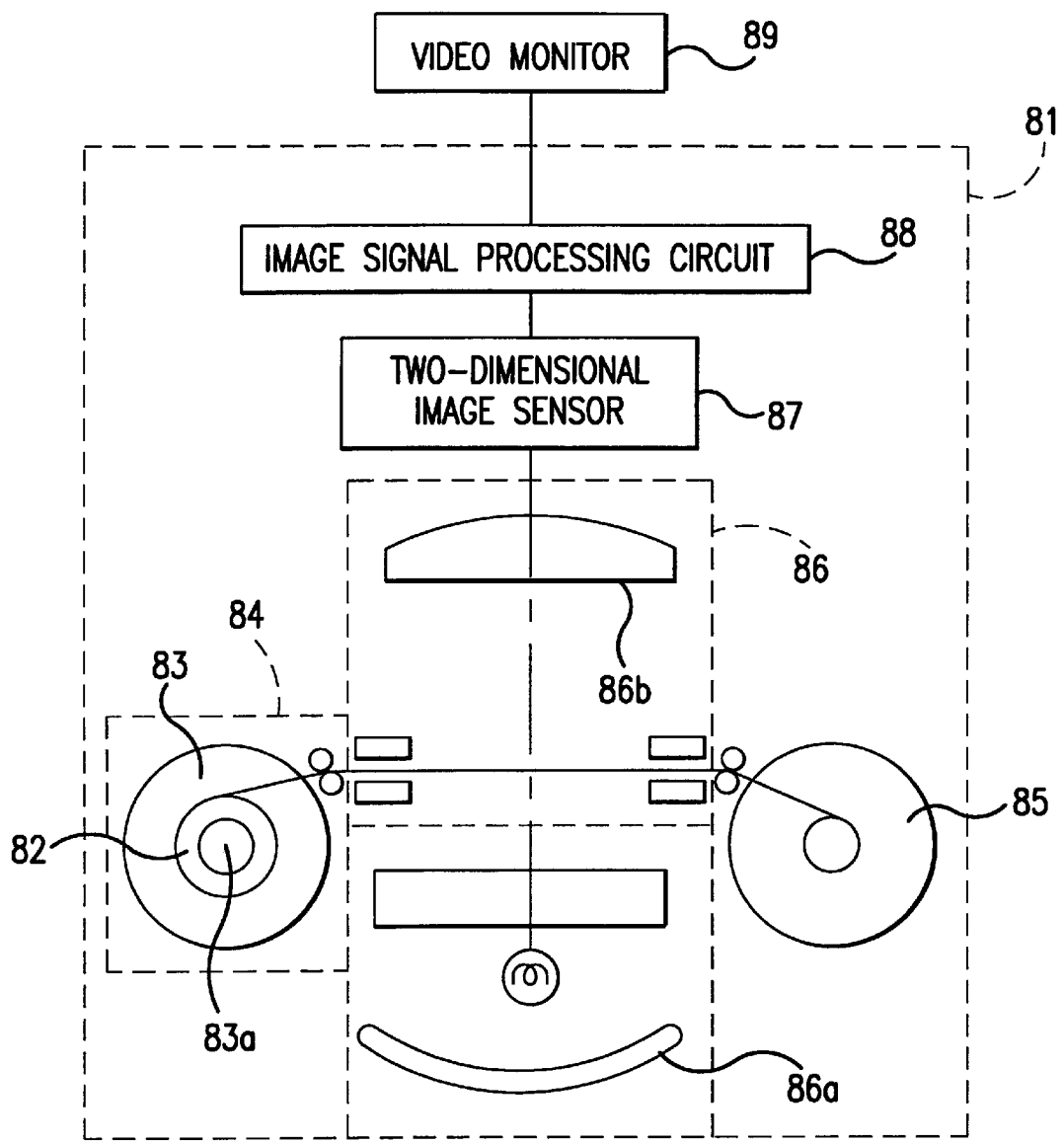
FIG. 8 is an elevation view showing the structure of a conventional film scanner.

FIG. 7 is a perspective drawing showing the structure of an information input system in a second preferred embodiment of the present invention.

In the first preferred embodiment described above, first a high-speed film scan is performed with the take-up by the take-up spool 152. The take-up spool 152 is driven by the DC motor 151.

Also, in the first embodiment a low-speed film scan for high-resolution reading is performed with the scan roller 14. The scan roller 14 is driven by the step motor 14b.

However, in this second preferred embodiment, both the high-speed and low-speed film scans are performed with the scan roller 14, or a single movement mechanism.

Referring to FIG. 7, the high-speed film scan is performed by scan roller 14 driven by a DC motor 151a, or a first drive source. The low-speed film scan is performed by the scan roller 14 driven by the step motor 14b, or a second drive source.

Consequently, in this second preferred embodiment, the tension roller 14a is always in a pressed state as shown in FIG. 6b. The film 39 is delivered out of film cartridge 3 and passed between the scan roller 14 and the tension roller 14a. The film 39 is wound by the take-up spool 152. The rest of the second embodiment shown in FIG. 7 is identical to the first embodiment shown in FIG. 3.

Alternative embodiments may be made to perform the image reading in the following manner:

First, when performing the high-speed film scan, one step motor could drive the take-up spool via a specified gear. This take-up spool would take up the film and perform the high-speed film scan.

When performing the low-speed film scan, the same step motor could drive the scan roller directly without going through the specified gear. The scan roller would feed the film and perform the low-speed scan.

Another alternative embodiment could be made to perform the image reading in the following manner:

First, when performing the low-speed film scan, one DC motor could drive the scan roller via a specified gear. This scan roller would feed the film and perform the low-speed film scan.

When performing the high-speed film scan, the same DC motor could drive the take-up spool without going through the gear. This take-up spool would take up the film and perform the low-speed film scan.

Still another alternative embodiment could be made to perform the image reading in the following manner:

In a modification of FIG. 7, first the DC motor 151a and the step motor 14b could be connected to the take-up spool 152.

When first performing the high-speed film scan, the DC motor 151a would drive the take-up spool. This take-up spool would take up the film and perform the high-speed film scan.

When performing the low-speed film scan, the step motor 14b would drive the take-up spool. This take-up spool would take up the film and perform the low-speed film scan.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An image input apparatus for reading images of a recording medium and converting the images into image data, said apparatus comprising:

a light source that illuminates the recording medium, a take-up spool that moves the recording medium at a first speed in a first direction by spooling the recording medium onto said spool;

a drive roller that moves the recording medium at a second speed that is slower than said first speed, said drive roller moving the recording medium with frictional forces generated by rotation of said drive roller while said drive roller is in contact with a first surface of the recording medium;

an image reader having a main scan direction and an auxiliary scan direction, said main scan direction being perpendicular to movement of the recording medium, said auxiliary scan direction being parallel to movement of the recording medium; a tension roller positioned adjacent to said drive roller to periodically contact a second surface of the recording medium opposing the first surface of the recording medium and bring the first surface into contact with said drive roller;

a gear mechanism drivingly connected between said drive roller and a first electric motor, said gear mechanism including a gear train including a ring gear fixed to said drive roller, a pinion gear driven by said first electric motor and meshed with said ring gear, a planetary gear meshed with said pinion gear and a cam gear alternately engaged and disengaged with said planetary gear, said cam gear having an integral cam lobe and a locking arm; and a lever arm pivotally mounted within said apparatus with said tension roller rotatably mounted at one end of said lever arm and with biasing means connected to an opposite end of said lever arm and with said cam gear mounted adjacent to said opposite end of said lever arm such that rotation of said cam gear causes said cam lobe to alternately:

push said lever arm against said biasing means for releasing said tension roller from contact with the second surface of the recording medium, and release said lever arm such that said biasing means pivots said lever arm to bring said tension roller into contact with the second surface of the recording medium.

2. The apparatus according to claim 1, wherein:

said lever arm includes a lock component extending from said opposite end of said lever arm; and said apparatus further includes:

a lever lock pivotally mounted within said apparatus adjacent said lock component, said lever lock being contacted and pivoted by said locking arm of said cam gear during rotation of said cam gear.

3. An image input apparatus for reading images of a recording medium and converting the images into image data, said apparatus comprising:

a light source that illuminates the recording medium;

a take-up spool that moves the recording medium at a first speed in a first direction by spooling the recording medium onto said spool;

a drive roller that moves the recording medium at a second speed that is slower than said first speed, said drive roller moving the recording medium with frictional forces generated by rotation of said drive roller while said drive roller is in contact with a first surface of the recording medium;

an image reader having a main scan direction and an auxiliary scan direction, said main scan direction being perpendicular to movement of the recording medium, said auxiliary scan direction being parallel to movement of the recording medium;

a first electric motor drivingly connected to said drive roller;

a second electric motor drivingly connected to said take-up spool;

a tension roller positioned adjacent to said drive roller to contact a second surface of the recording medium opposing the first surface of the recording medium and bringing the first surface into contact with said drive roller;

a data input device that allows a user to specify a particular image for examination;

a sensing device that detects when the recording medium has been moved to a position at which said image reader can read a particular image specified by a user;

a gear mechanism connected to said tension roller and to said drive roller and controlling the contact of said tension roller against the second surface of the recording medium, said gear mechanism including a gear train, said gear train including a ring gear fixed to said drive roller, a pinion gear driven by said first electric motor and meshed with said ring gear, a planetary gear meshed with said pinion gear and a cam gear alternately engaged and disengaged with said planetary gear, said cam gear having an integral cam lobe and a locking arm; and a lever arm pivotally mounted within said apparatus with said tension roller rotatably mounted at one end of said lever arm and with biasing means connected to an opposite end of said lever arm and with said cam gear mounted adjacent to said opposite end of said lever arm such that rotation of said cam gear causes said cam lobe to alternately:

push said lever arm against said biasing means for releasing said tension roller from contact with the second surface of the recording medium, and release said lever arm such that said biasing means pivots said lever arm to bring said tension roller into contact with the second surface of the recording medium.

4. The apparatus according to claim 3, wherein:

said lever arm includes a lock component extending from said opposite end of said lever arm; and said apparatus further includes:

a lever lock pivotally mounted within said apparatus adjacent said lock component, said lever lock being contacted and pivoted by said locking arm of said cam gear during rotation of said cam gear.

5. An image input apparatus, comprising:

a light source that projects light onto a recording medium;

an image reader for converting images recorded on said recording medium and illuminated by said light source into electrical signals;

a recording medium movement mechanism that moves said recording medium in a first direction;

a first drive source that drives said movement mechanism at a first speed;

a second drive source that drives said movement mechanism at a speed different from said first speed; and said image reader reading two-dimensionally said images recorded on said recording medium by scanning said recording medium in said first direction as said recording medium is moved in said first direction by said movement mechanism.

6. The image input apparatus according to claim 5, further comprising a controller that controls said image input apparatus to read all images on the recording medium while causing the recording medium to be driven at high speed, and subsequently causes all the read images to be displayed on an external display device, and subsequently controls the image input apparatus to read specified ones of the images on the recording medium while causing the recording medium to be driven at a low speed that is slower than said high speed.

7. The image input apparatus according to claim 5, further comprising a controller that causes the recording medium to be moved at a high speed until a specified portion on the recording medium is detected, and subsequently controls the image reader to read a specified image on the recording medium while causing the recording medium to be moved at a low speed that is slower than said high speed.

8. An image input apparatus for reading images recorded on a recording medium, comprising:

a light source for illuminating said recording medium;

an image reader for converting said images recorded on said recording medium and illuminated by said light source into electrical image signals;

a drive roller for moving the recording medium with frictional forces generated by rotation of said drive roller while said drive roller is in contact with a first surface of the recording medium;

a tension roller positioned adjacent to said drive roller for contacting a second surface of the recording medium opposing the first surface of the recording medium to bring the first surface into contact with said drive roller;

a designating device for designating at least one image area from a plurality of image areas recorded on said recording medium;

a sensing device that detects an image area that is designated by said designating device and outputting a detecting signal;

a controller comprising a switching mechanism that switches between a first position at which the tension roller causes said recording medium to pressure-contact said drive roller and a second position at which the tension roller causes said recording medium to be released from pressure-contact with said drive roller;

wherein said controller controls said switching mechanism to place said tension roller in said first position in response to said detecting signal, and to hold said tension roller at said first position when at least two adjacent image areas have been designated by said designating device, and images of the at least two adjacent image areas are converted by said image reader.

9. A storage medium for use with an image reading apparatus that includes a film cartridge housing that holds a film cartridge having a cartridge spool onto which a film is wound, a light source that illuminates the film after the film has been fed from the film cartridge, an image reader that converts images recorded on the film into image data, a first film feeding mechanism that feeds the film from the film cartridge by driving the cartridge spool, and a second film feeding mechanism that feeds the film, said storage medium being encoded with a computer-readable control program comprising:

a first feed procedure that feeds said film from said film cartridge by driving said first film feeding mechanism; and a second feed procedure that feeds said film after said film reaches said second film feeding mechanism by driving said second film feeding mechanism.

10. The storage medium according to claim 9, wherein said control program further comprises:

an illumination procedure that causes said light source to illuminate said film after said film is fed from said film cartridge; and an imaging procedure that causes said image reader to convert images recorded on said film into said image data.

11. The storage medium according to claim 9, wherein said second feed procedure causes said second film feeding mechanism to feed said film at a second speed that is slower than a first speed by which said first feed procedure causes said first film feeding mechanism to feed said film.

12. The storage medium according to claim 9, wherein said image reading apparatus further comprises:

a film detector that outputs a film sensing signal when said film detector detects that said film has reached said second film feeding mechanism;

wherein said second feed procedure causes said film to be fed by driving said second film feeding mechanism in accordance with said film sensing signal.

13. The storage medium according to claim 12, wherein said control program further comprises:

a determination procedure that determines whether film is present by checking whether said film sensing signal is output by said film detector within a predetermined time from a start of said first feed procedure driving said cartridge spool with said first film feeding mechanism.

14. A method of reading images from a recording medium comprising the steps of:

projecting light onto the recording medium while an image reader converts images recorded on the recording medium into electric signals;

moving the recording medium in a first direction with a recording medium movement mechanism;

selectively driving the recording medium movement mechanism with one of a first drive source that drives the movement mechanism at a first speed and a second drive source that drives the movement mechanism at a second speed different from said first speed;

said image reader two-dimensionally reading said images recorded on said recording medium by scanning said recording medium in said first direction as said recording medium is moved in said first direction by said movement mechanism.

15. The method of claim 14, further comprising:

reading all images on the recording medium with the image reader while driving the movement mechanism at a high speed;

subsequently displaying all the read images on a display screen; and subsequently reading specified images on the recording medium with the image reader while driving the movement mechanism at a low speed that is slower than said high speed.

16. The method of claim 14, further comprising:

driving the movement mechanism at a high speed until a specified portion on the recording medium is detected; and subsequently reading a specified image on the recording medium with the image reader while driving the movement mechanism at a low speed that is slower than said high speed.

* * * * *